(12) United States Patent
Dolinsky et al.

(10) Patent No.: US 8,949,805 B2
(45) Date of Patent: Feb. 3, 2015

(54) PROCESSING METHOD

(75) Inventors: Jens-Uwe Dolinsky, Edinburgh (GB); Andrew Richards, Edinburgh (GB); Colin Riley, Edinburgh (GB)

(73) Assignee: Codeplay Software Limited, Edinburgh (GB)

( * ) Notice: Subject to any disclaimer, the term of this patent is extended or adjusted under 35 U.S.C. 154(b) by 352 days.

(21) Appl. No.: 13/379,566

(22) PCT Filed: Jun. 11, 2010

(86) PCT No.: PCT/GB2010/001145
§ 371 (c)(1),
(2), (4) Date: Dec. 20, 2011

(87) PCT Pub. No.: WO2010/149949
PCT Pub. Date: Dec. 29, 2010

(65) Prior Publication Data
US 2012/0110559 A1 May 3, 2012

(30) Foreign Application Priority Data

Jun. 26, 2009 (GB) .................................. 0911099.0

(51) Int. Cl.
G06F 9/45 (2006.01)

(52) U.S. Cl.
CPC ....................................... *G06F 8/45* (2013.01)
USPC .......................................... 717/149; 717/131

(58) Field of Classification Search
None
See application file for complete search history.

(56) References Cited

U.S. PATENT DOCUMENTS

| | | | | |
|---|---|---|---|---|
| 8,336,038 B2* | 12/2012 | Richards et al. | ............... | 717/149 |
| 8,352,921 B2* | 1/2013 | Jegoulev et al. | ............... | 717/131 |
| 8,397,224 B2* | 3/2013 | Moler | ............ | 717/149 |
| 2002/0147760 A1* | 10/2002 | Torii | .............. | 709/107 |
| 2004/0083462 A1 | 4/2004 | Gschwind et al. | | |
| 2006/0005179 A1* | 1/2006 | Kawahara et al. | ............ | 717/157 |
| 2006/0123401 A1* | 6/2006 | O'Brien et al. | ............... | 717/131 |
| 2007/0067758 A1* | 3/2007 | Findeisen et al. | ............. | 717/140 |
| 2008/0005728 A1* | 1/2008 | Morris | .......... | 717/153 |
| 2008/0120590 A1* | 5/2008 | Wang et al. | ................... | 717/100 |
| 2008/0222620 A1* | 9/2008 | Little et al. | .................... | 717/149 |
| 2009/0055625 A1* | 2/2009 | Howard et al. | ................. | 712/28 |
| 2009/0064095 A1* | 3/2009 | Wallach et al. | ............... | 717/106 |

OTHER PUBLICATIONS

International Search Report received in corresponding PCT patent application No. PCT/GB2010/001145, mail date Feb. 15, 2011.

(Continued)

*Primary Examiner* — Don Wong
*Assistant Examiner* — Daxin Wu
(74) *Attorney, Agent, or Firm* — Wong, Cabello, Lutsch, Rutherford & Brucculeri, L.L.P.

(57) ABSTRACT

A method for processing computer program code to enable different parts of the computer program code to be executed by different processing elements of a plurality of communicating processing elements. The method comprises identifying at least one first part of the computer program code, which is to be executed by a particular one of said processing elements. The method further comprises identifying at least one further part of the computer code which is related to the at least one first part of the computer code. The at least one first part of the computer program code and the at least one further part of the computer program code are caused to be executed by the particular one of said processing elements.

29 Claims, 12 Drawing Sheets

(56) References Cited

OTHER PUBLICATIONS

Anonymous: "Direct Memory Access" [Online] Jun. 5, 2009, pp. 1-5, XP002597083; Retrieved from the Internet: URL:hhp://en.wikipedia.org/w/index.php?title=Direct_memory_access&oldid=294513947>[retreived on Aug. 12, 2010] the whole document.

* cited by examiner

```
void exFunc()
    {
        // code here should be executed by the host processor
        __accelerationsection__
        {
            // code here should be executed by an accelerator processor
        }
    }
```

FIG 4

```
void __acceleratedfunction__ speedyFunction ()
    {
        // function should be executed on an accelerator core
    }
```

FIG 5

```
void f (void (*functionPointer)(void) )
    {
        _accelerationsection_ (acceleratefunctions: a, b, c)
        {
            functionPointer ();
        }
    }
```

FIG 6

```
void f ( )
{
    int outerval = 2;
    _accelerationsection_
    {
        int innerval = 4;
        int result = outerval + innerval;
    }
}
```

FIG 7

```
int multiply(int a, int b)
{
        return a*b;
}
```

FIG 8

```
int b;

int new_multiply(int a)
{
        return a*b;
}
```

FIG 9

```
int another_multiply(int* a, int* b)
{
        return (*a)*(*b);
}
```

FIG 10

```
1    int func (int &a, int &b)
2    {
3           return a * b;
4    }
5    int main ()
6    {
7           int a = 2;
8           int result = func(a,a); // host func(int&,int&)
9           accelerationsection
10          {
11                 int b = 3;
12                 b = func(a,b); // transformed func(__outer int&, int&)
13                 b = func(b,a); // transformed func(int&, __outer int&)
14                 result += func(b,b); // transformed func(int&,int&)
15          }
16   }
```

FIG 11

```
int findMin(int *intList)
{
        int result = *intList;
        for (int*p = intList+1; *p != -1; p++)
                if (*p < result)
                        result = *p;
        return result;
}
int arrayOfIntegers[100] = { ... };
int main ()
{
        accelerationsection
        {
                int smallest1 = findMin(arrayOfIntegers);
                int localArrayOfintegers[100] = { .... };
                int smallest2 = findMin(localArrayOfIntegers);
        }
}
```

FIG 12

```
1    float x;
2    int main ()
3    {
4            accelerationsection
5            {
6                    __outer float* p = &x;
7                    float a = *p;
8                    *p = 1.0f;
9                    float b = x;
10                   x = b;
11                   p = &a;
12           }
13   }
```

FIG 13

```
T *x
accelerationsection
{
        __outer T* z = x;
        T* z2 = x;
}
```

FIG 14

```
T1 *g;
int main ()
{
        accelerationsection
        {
                __outer T2* var;
                var = (T2*) g;
        }
}
```

FIG 15

```
float reinterpretInt(int*i)
{
        return *((float *)i);
}
```

FIG 16

```
class MyObject
{
        int field;
        int getIncrementedField ()
        {
                return ++field;
        }
};
```

FIG 17

```
class MyObject {
        int field;
        int getIncrementedField () __private {
                // this increments and returns the field value on a private object
                return ++field;
        }
        int getIncrementedField () __shared {
                // this increments and returns the field value on a shared object
                return ++field;
        }
};
```

FIG 18

```
1    int global;
2    void f()
3    {
4        int host_local;
5        accelerationsection
6        {
7            int shared_local = host_local;
8            accelerationsection
9            {
10               int private_local = shared_local * 2;
11               shared_local = private_local;
12           }
13       }
14   }
```

PROCESSING METHOD

CROSS REFERENCE TO RELATED APPLICATIONS

The present application is a National Stage entry from PCT Patent Application No. PCT/GB2010/001145 filed on 11 Jun. 2010, which claims priority to Great Britain 0911099.0 filed on 26 Jun. 2009, the contents of each one incorporated herein by reference.

BACKGROUND OF THE INVENTION

The present invention relates to methods for processing computer program code, and more particularly to methods for processing computer program for execution on a plurality of processing elements.

Computers generally comprise a plurality of interacting components that work in combination to allow the computer to carry out tasks requested by a user. One component is the central processing unit (CPU), which is responsible for executing instructions and directing other components within the computer to perform their designated functions.

Computers are now widely used in a variety of different applications in business and leisure environments, and the demands placed upon computer processing power continue to increase. For example, in some business applications there is a need to rapidly process increasing quantities of complex information. In leisure applications, computers are used for entertainment purposes and as user expectations of the sophistication of computer graphics increase, processing performance is required to increase to generate computer graphics which satisfies user expectations.

Generally, computers with a single CPU can only execute one instruction in any clock cycle. This inevitably restricts processor performance by limiting the number of instructions that can be executed in a given time period. With this in mind, CPUs with more than one processor core, generally referred to as multi-core processors, have been employed in computers. As each processing core in a multi-core processor can execute instructions concurrently, more than one instruction can be executed at any one time thereby improving processor performance.

Multi-core processors therefore provide the ability to process the instructions of an application in parallel using more than one processor core. An application may be split into a number of separately processable tasks (often called threads) each of which can be executed on a separate processor core.

Taking advantage of parallel processing for single applications requires applications to be purposely designed with threads to make use of the multiple processor cores. Designing applications to use multiple processor cores is generally considered to be a complex and difficult task. In general terms, the complexity and difficulty of designing applications to use multiple processor cores increases with the number of processor cores used. Designing programs with multiple threads introduces the need to manage data which may be used by multiple threads, and to ensure that particular threads are not executed before other threads on which they depend.

For existing programs, the problem is made worse by the need to re-write the application to make use of the multiple processor cores, ensuring that the integrity of the program is maintained.

SUMMARY

According to a first aspect of the invention, there is provided, a method for processing computer program code to enable different parts of the computer program code to be executed by different processing elements of a plurality of communicating processing elements. The method comprises identifying at least one first part of the computer program code which is to be executed by a particular one of said processing elements, identifying at least one further part of the computer code which is related to said at least one first part of the computer code, and causing said first part of the computer program code and said further part of the computer program code to be executed by the particular one of said processing elements.

In this way, when a first part of the computer program code is identified to be executed by a particular processing element, the method of the first aspect of the invention can be used to ensure that related computer program code is also executed by the particular processing element.

Each of the processing elements may have a respective type and identifying at least one first part of the computer program code which is to be executed by a particular one of said processing elements may comprise identifying a particular type of processing element on which the at least one first part of the computer program code is to be executed. Causing the first part of the computer program code and the further part of the computer program code to be executed by the particular one of the processing elements may comprise causing the first part of the computer program code and the further part of the computer program code to be executed by one of the processing elements having the particular type.

A plurality of the processing elements may be processing elements of the particular type on which the first part of the computer program code and the further part of the computer program code is to be executed and causing the first part of the computer program code and the further part of the computer program code to be executed by one of the processing elements having the particular type may further comprise selecting one of the plurality of processing elements having the particular type.

Identifying at least one first part of the computer program code may comprise identifying at least one program construct indicating that the at least one first part of the computer program code is to be executed by said particular one of said processing elements. That is, the identification may be based upon markers inserted into the computer program code by a programmer. The markers can conveniently be added to existing computer program code, thereby providing a means for modifying existing computer program code to indicate that particular parts of the computer program code should be executed on particular processing elements.

Said further part of the computer program code may be referenced in said at least one first part of the computer program code. For example, the further part of the computer program code may be a function, and said function may be called from said at least one first part of the computer program code.

The function may be called indirectly from said at least one first part of the computer program code. For example, the reference to the further part of the computer program code in the at least one first part of the computer program code may be a call to a virtual function where the further part of the computer program code is a particular implementation of that virtual function. Alternatively, the first part of the computer program code may be arranged to receive a reference to the function and to call said function in response to receipt of said reference. For example, the first part of the computer program code may be arranged to receive a function pointer to the function, and to call the function in response to receiving the function pointer.

Causing the first computer program code and the further computer program code to be executed by the particular one of the processing elements may comprise compiling said first part of the computer program code and said further part of the computer program code for the particular one of the processing elements. For example, different ones of the processing elements may have different instruction sets, and the causing may therefore comprise selecting a target instruction set into which the computer program code is to be compiled.

The method may further comprise identifying at least one second part of the computer program code which is to be executed by a plurality of said processing elements, and causing said second part of the computer program code to be executed by said plurality of said processing elements.

The computer program code may comprise first and second references to the second part of the computer program code, and causing said second part of the computer program code to be executed by said plurality of said processing elements may comprise causing said second part of said computer program code to be executed by a first processing element in response to said first reference and by a second processing element in response to said second reference. The first processing element may be determined based upon a processing element executing the first reference and the second processing element maybe determined based upon a processing element executing the second reference.

The plurality of processing elements may access data stored in a plurality of storage areas, for example a plurality of memories. Said causing may comprise modifying said first part of said computer program code and said further part of said computer program code to access data in the plurality of storage areas.

The computer program code may comprise a plurality of context levels and said modifying may comprise modifying at least one memory access operation based upon said context levels. For example at least one memory access operation may be modified based upon the relative context levels at which a data item associated with the memory access operation is declared and at which the memory access operation is effected. Examples of data items are variables and constants. Generally, the terms variable and data item are used interchangeably herein and refer to any data stored in a memory location.

Each context level may have an associated storage area, and said modifying may comprise modifying a memory access operation in a first context level which accesses data in a storage area associated with a second context level, the second context level being distinct from the first context level. Said modifying may comprise adding an identifier of the storage area associated with the second context level to the memory access operation.

Modifying may comprise modifying the memory access operation in the first context level to access a software implemented cache associated with the second context level.

Modifying may comprise modifying the memory access operation such that the memory access operation is performed using a software transactional memory (STM) technique.

Modifying may comprise modifying the memory access operation such that the memory access operation is performed using a data transfer over a computer network. For example, storage space associated with a particular context level may be located remotely and access to the storage level associated with the particular context level may be performed over a network.

For a storage space associated with a particular context level, data stored within that storage space may be subject to automatic memory management, such as garbage-collection. A garbage collection system may be operable to reclaim storage allocated in any of the memory spaces where it is determined that no pointers or references to that data are retained in any context level. One of the memory spaces associated with a particular context level may be treated as a garbage-collected memory space, wherein all memory references in that context level are tracked for the purposes of garbage collection. Any location within the garbage-collected memory space storing data not reachable by a pointer within the context level may be made available for release from the allocated data pool so that it can be used to store other data.

Said further part of said computer program may be referenced in said computer program code at least twice, each reference comprising a respective memory access operation. The method may further comprise creating a first modification of said further part of said computer program code based upon a first respective memory access operation and creating a second modification of said further part of said computer program code based upon a second respective memory access operation.

The first memory access operation may access data in a first storage area and the second memory access operation may access data in a second different storage area.

The method may further comprise processing the first reference to said further part of said computer program code to add reference to the first modification of said further part of said computer program code, and processing the second reference to said further part of said computer program code to add reference to the second modification of said further part of said computer program code.

The method may further comprise creating a copy of said first and further parts of said computer program code wherein the causing comprises modifying the copy of the first part of said computer program code and the copy of the further part of the computer program code to access data in the plurality of storage areas.

According to a second aspect of the invention, there is provided a method for processing computer program code to enable different parts of the computer program code to be executed by different processing elements of a plurality of communicating processing elements, wherein the computer program code references a plurality of data items, at least one data item being stored in a memory local to a particular processing element, and at least another data item being stored in a memory shared between a plurality of processing elements. The method comprises processing a first part of the computer program code comprising a reference to a first of said data items, determining a memory in which said first data item is stored, and modifying the computer program code to indicate the determined memory.

In this way, computer program code can be modified to ensure that references within the computer program to a plurality of different memories are correctly processed to identify the appropriate memory.

Said first part of the computer program code may be executed on a first processing element, and said determining may comprise determining whether the first data item is declared in a part of the computer program code to be executed on the first processing element.

The computer program code may define a plurality of context levels, and determining a memory in which said first data item is stored may comprise determining a context level at which said first data item is declared. The modifying may be carried out if but only if said first part of said computer program code occurs at a different context level to a context level at which the first data item is declared.

Each respective reference to a plurality of data items may be either a static pointer or a dynamic pointer. Whether a particular reference is a static pointer or a dynamic pointer may effect the modification of the computer program code to indicate the determined memory. For example, where a reference is a static pointer, the type of the pointer may be modified, and where a reference is a dynamic pointer, the value of the pointer may be modified.

The modifying may comprise creating a duplicate of the reference to the first data item and modifying the duplicate to indicate the determined memory.

Modifying the duplicate to indicate the determined memory may comprise modifying the duplicate to indicate the context level associated with the determined memory. The indication of the context level associated with said determined memory may be an indication of a context level at which the first part of the computer program code occurs. For example, modifying may comprise the addition of an appropriate keyword to the reference to indicate that the context level at which the first computer program code occurs is outside the context level of the context level first data item is declared.

At least one data item in the plurality of data items may be a function. The reference to the data item may therefore be a reference to a function. Examples of references to functions include function pointers, virtual methods and member function pointers.

According to a third aspect of the invention, there is provided, a method for determining syntactic and/or semantic correctness of computer program code to be run in a system comprising plural memories, the method comprises identifying a first instruction assigning a first pointer data item to a value of a second pointer data item, determining whether said first and second pointer data items each identify a memory location in a common memory, and if it is determined that said first and second pointer data items do not identify a memory location in a common memory, indicating an error.

According to a fourth aspect of the invention, there is provided a method for processing computer program code to cause the computer program code to run across multiple processing elements. The method comprises attaching modifiers to at least one part of the computer program code to indicate that the at least one part of the computer code should run on a particular processing element.

The processed computer program code may be, before attachment of said modifiers, arranged to run on a single processing element. The computer program code may define at least one single flow of control intended to run on single processing element and said modifiers may cause a part of the single flow of control to run on another processing element.

Each of the processing elements may have a respective type and at least two of the processing elements have different types. The processed computer program code may, before attachment of said modifiers, be arranged to run across multiple processing elements each having the same type. For example, the computer program code may, before attachment of the modifiers, be arranged to run on a homogeneous multi-core processor, and attachment of the modifiers may cause the computer program code to run on a heterogeneous multi-core processor.

The processing elements may be processors or processing cores of a multi-core processor.

According to a fifth aspect of the present invention, there is provided a method for processing computer program code to enable different parts of the computer program code to be executed by different processing elements of a plurality of communicating processing elements, the method comprising: indicating a set of parts of said computer program code to be executed by different processing elements. The set of parts may be determined at link time based upon the indication. The set of parts of the computer program code may be a set of functions. Indication of a set of parts of the computer program code may include placeholders which indicate a location, the location containing a set of functions. The placeholders may then be examined at link-time to find the actual set of functions indicated by the placeholder so that the set of functions can be modified for execution by different processing elements.

According to a sixth aspect of the present invention, there is provided a method for making computer program code suitable for execution in an environment comprising a plurality of storage spaces, wherein the computer program code comprises at least one type definition including a reference to one of said storage spaces, the method comprising: creating a copy of said type definition by replacing said reference to said one of said storage spaces with a reference to another of said storage spaces.

The type definition may define one of a struct type, a union type, or a class.

It will be appreciated that aspects of the invention can be implemented in any convenient way. For example, the invention may be implemented by appropriate computer programs which may be carried on appropriate carrier media which may be tangible carrier media (e.g. disks) or intangible carrier media (e.g. communications signals). Aspects of the invention may also be implemented using suitable apparatus which may take the form of programmable computers running computer programs arranged to implement the invention.

It will further be appreciated that features of the present invention described with reference to one aspect of the present invention may be included within any other aspect of the present invention.

BRIEF DESCRIPTION OF THE DRAWINGS

Embodiments of the present invention are now described, by way of example, with reference to the accompanying drawings, in which:

FIGS. 4 to 6 are examples of program code illustrating modifications made to define acceleration sections and acceleration functions in accordance with an embodiment of the present invention;

FIG. 7 is an example of program code illustrating data access inside an acceleration section in accordance with an embodiment of the present invention;

FIG. 8 is an example of program code illustrating a function which is not transformed by processing in accordance with an embodiment of the present invention;

FIGS. 9 to 12 are examples of program code illustrating functions which are transformed by processing in accordance with an embodiment of the present invention;

FIG. 13 is an example of program code illustrating data accesses in accordance with an embodiment of the present invention;

FIG. 14 is an example of program code illustrating pointer initialisation;

FIGS. 15 and 16 are examples of program code showing pointer casts;

FIG. 17 is an example of program code showing object oriented classes;

FIG. 18 illustrates the program code of FIG. 17 processed in accordance with an embodiment of the present invention;

DETAILED DESCRIPTION OF THE INVENTION

Figure 1:
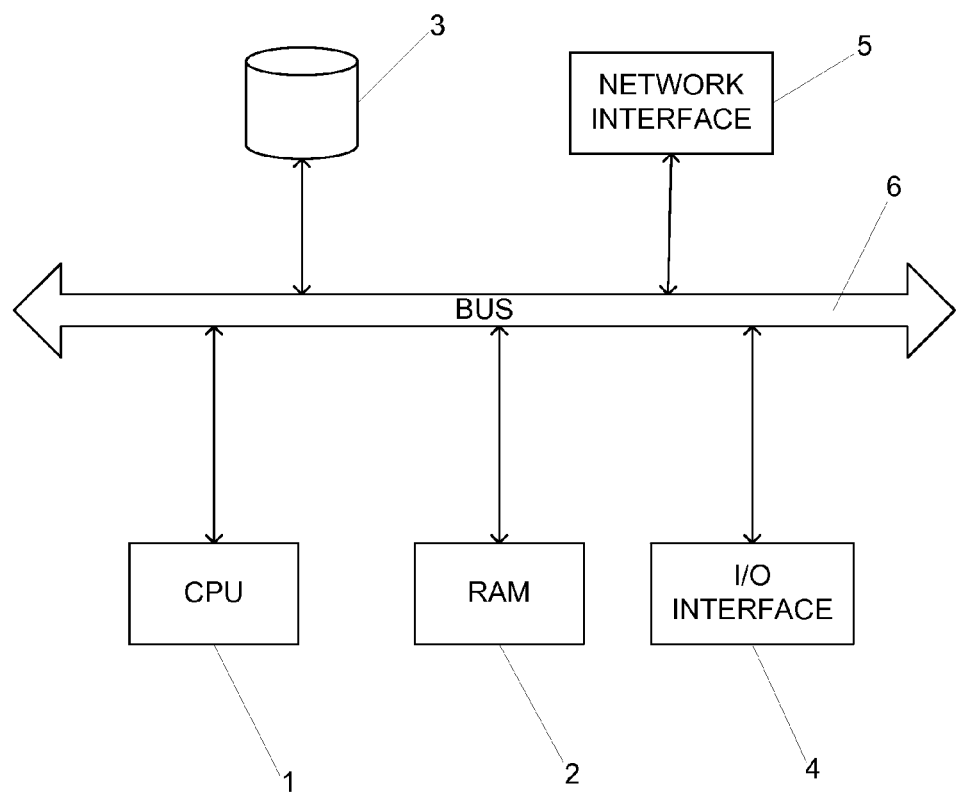
FIG. 1 is a schematic illustration showing components of a computer comprising a multi-core processor.

FIG. 1 is a schematic illustration of a computer apparatus. The computer apparatus comprises a processor 1 which is arranged to read and execute instructions stored in a volatile memory which takes the form of RAM 2. The RAM 2 stores both instructions making up programs which are executed by the computer as well as data used by the programs. The computer apparatus further comprises non-volatile memory in the form of a hard disk drive 3. The computer apparatus also comprises an I/O interface 4 allowing communication with appropriate input/output devices and a network interface 5 arranged to allow communication with a computer network by wired or wireless means. The aforementioned components are connected together by a communications bus 6.

Figure 2:
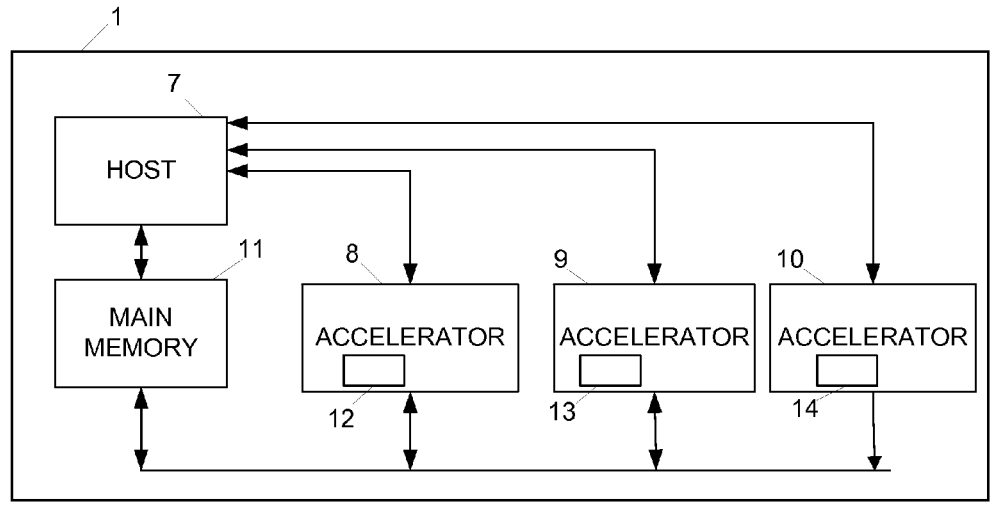
FIG. 2 is a schematic illustration showing the multi-core processor of FIG. 1 in further detail.

The developments described herein relate to the execution of computer programs by the processor 1 which is a multi-core processor of a type described with reference to FIG. 2. FIG. 2 schematically illustrates a multi-core processor comprising a host core 7 and three accelerator cores 8, 9, 10. The multi-core processor further comprises shared memory 11 which is accessible by the host core 7 as well as each of the accelerator cores 8, 9, 10. Additionally, each of the accelerator cores 8, 9, 10 has a respective local "scratch-pad" memory 12, 13, 14. The host core 7 is the main controlling processing unit, whereas the accelerator cores 8, 9, 10 are processing units that are assigned to assist the host core 7 with particular functions specified by executed programs. The shared memory 11 may be directly accessed by the host core 7, while each of the accelerator cores 8, 9, 10 can access the shared memory 11 through direct memory access (DMA). The accelerator cores may be able to access any location in the shared memory 11 at random. There may however be additional constraints on the accelerator cores' access to the shared memory 11. For example, read and write operations may be subject to a minimum or maximum data size, the size of data read or written may be constrained to certain multiples of bytes (e.g. 4, 8, 12, 16) and it may be required that the data being accessed is aligned in the memory 11 (e.g. the accelerator cores 8, 9, 10 may only be able to access data stored at addresses that are even multiples of a power of two).

That is, the accelerator cores access to shared memory may be constrained in ways that differ from the host core's access to memory.

Each of the host core 7 and the accelerator cores 8, 9, 10 may be identical, in which case the processor 1 is referred to as a homogeneous multi-core processor. Alternatively the multi-core processor 1 may be a heterogeneous multi-core processor in which the cores 7, 8, 9, 10 differ from one another, for example, each of the accelerator cores 8, 9, 10 may provide a respective different function. For example, a heterogeneous multi-core processor may comprise a general-purpose host core and a number of specialised accelerator cores, such as a physics engine, a synergistic processing element or graphical processing unit (GPU). The different accelerator cores within a heterogeneous multi-core processor may use different instruction sets, may have differently sized local memories 12, 13, 14 and may have different performance characteristics.

Figure 3A:
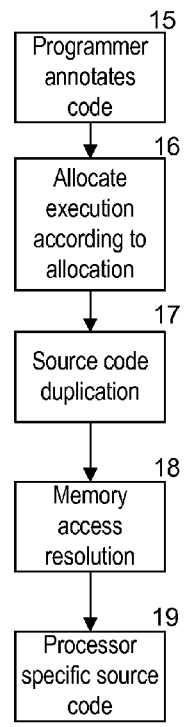
FIG. 3A is a schematic illustration showing, in overview, processing of program code to allow that code to run on a multi-core processor.

Many computer programs are, and have been, written with the intention of sequential execution. Such programs cannot, easily, take advantage of parallel processing capabilities provided by multi-core processors of the type shown in FIG. 2 and discussed above. An overview of a system for processing sequentially defined computer programs so as to take advantage of the parallelism provided by multi-core processors is now described with reference to FIGS. 3A and 3B.

In very general terms, embodiments of the invention allow computer program code to be processed such that different parts of the processed code are executed on different processor cores. An overview of the process is set out in FIG. 3B.

At block 15 source code is annotated to include at least one indication of source code that should be executed on a particular processor. This annotation may be carried out manually by a human programmer. At block 16 parts of the processed source code are allocated to processor cores based upon the annotation. At block 17, various parts of the source code are duplicated so as to allow those duplicated parts of the source code to be executed on more than one processor core. Duplication of parts of the source code is described in further detail below, but in general terms relates to processing parts of the source code for execution on a plurality of execution units, which may be, for example, processors, processor cores and/or computer network nodes. The duplication also allows the duplicated (or processed) code to process data stored in both the shared memory 11 and one of the memories 12, 13, 14 local to the accelerator cores 8, 9, 10, given that different versions of particular code may need to be generated to access data stored in different memories. It will often be the case that source code which is duplicated comprises functions called from different parts of the source code with different arguments.

Various other parts of the code are processed at a block 18 to ensure compatibility of the code with multi-core processor execution, for example to ensure consistency between pointers targeting the shared memory and pointers targeting one of the memories 12, 13, 14 local to one of the accelerator cores 8, 9, 10.

Having carried out the processing described above, source code for each processor core is created at block 19 for compilation by a compiler appropriate to that processor core.

Figure 3B:
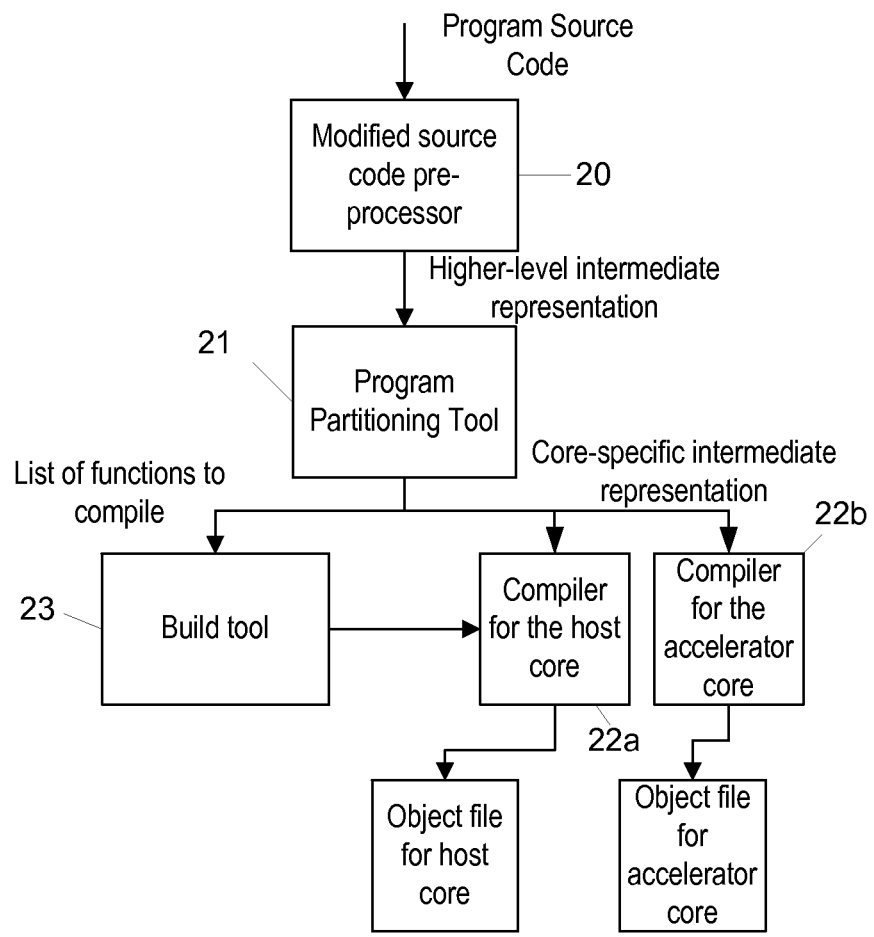
FIG. 3B is a schematic illustration showing an overview of processing in accordance with an embodiment of the invention.

Referring now to FIG. 3B, a source code pre-processor 20 takes source code written in a programming language, such as C, C++, C# or Java®, which has been modified by a user to identify sections of the source code that should be compiled for processing and execution on specific cores 7, 8, 9, 10 of the multi-core processor 1 and to identify data that should be placed in the shared memory 11 or in the memory 12, 13, 14 of one of the acceleration cores 8, 9, 10.

The source code pre-processor 20 outputs functions and variables to a program-partitioning tool 21. The form of the functions and variables output from the source code pre-processor 20 could be, for example, a list of source program lexical tokens, an abstract syntax tree, or a higher-level compiler intermediate representation. The output of the source code pre-processor 20 includes information to indicate which source code has been explicitly marked for processing by a particular processor core, and information representing any explicit indications of whether particular data is shared between processor cores or is specific to one of the accelerator cores. The representation may be stored in the RAM 2, or may be saved to the hard disk drive 3 so that the representation of the entire program is available to the program-partitioning tool 21. The output from the source code pre-processor 20 is referred to as a higher-level intermediate representation.

In addition to standard pre-processing tasks (such as, in C and C++, the processing of #include and #define statements etc), the pre-processor 20 may perform syntax and type checking on the supplied modified source-code, and reject syntactically and semantically incorrect source code.

The program partitioning tool 21 ensures that any section of source code that has been specified to be executed on a specific processor core is indeed executed on that processor core. Similarly, the program partitioning tool 21 ensures that if the source code specifies that data is to be shared between cores or accessed by only a specific one of the cores, the data is indeed processed as specified.

The program partitioning tool 21 outputs respective program code and data for each of the processor cores 7, 8, 9 10. In doing this, the program partitioning tool 21 makes various modifications to the original source code to ensure that execution and storage are handled as desired. The nature of these modifications is discussed in further detail below. The program partitioning tool 21 may output program code and data in a human-readable programming language such as C. Alternatively, the program partitioning tool 21 may output code and data in a compiler intermediate representation. Code and data is output for each processor core 7, 8, 9, to a plurality of compilers 22. Two compilers 22a, 22b are shown in FIG. 3, a first compiler 22a receives program code specific to the host core 7, while a second compiler 22b receives program code for a specific one of the accelerator cores 8, 9, 10.

The compilers 22 convert the output of the program partitioning tool 21 into executable code for each of the processor cores 7, 8, 9, 10. The program partitioning tool 21 further outputs a list of functions to a build tool 23. The build tool 23 analyses the call stack for each processor core 7, 8, 9, 10 as is described in further detail below.

It has been indicated above that the source code pre-processor 20 receives high-level language computer program code which has been modified to indicate that particular code should be implemented on particular processor cores. Such modifications are now described in further detail. Modifications made to the source code are arranged to introduce new concepts to the programming language in which the source code is written. In particular, modifications to source code can be used to introduce acceleration sections (indicating that code within an acceleration section should be executed on a particular processor), and context indications (indicating a memory on which data should be stored) each of which is described in further detail below.

An acceleration section is a section of code that is specified to run on one of the accelerator cores 8, 9 10. An acceleration section indicated using a keyword to indicate code that should be run on an accelerator core. For example, inside a function, a programmer inserts the annotation "accelerationsection" to indicate that code (enclosed within braces for example) following the keyword should be executed on an accelerator core, where code is to be executed on a processor having more than one processor core. There may be more than one type of acceleration section available (each having an associated keyword), thereby allowing a programmer to indicate that particular sections of source code should be executed on a particular one of the accelerator cores 8, 9, 10. It will be appreciated that the annotation 'accelerationsection' is provided only as an example and that any suitable annotation could be used. It will also be appreciated that there is no requirement to use any particular syntax.

The example code of FIG. 4 defines a function exFunc which includes an acceleration section code block identified by the annotation, _accelerationsection_. Any code within the acceleration section code block should be executed on an accelerator processor, for example the accelerator core 8, while code outside of the acceleration section code block should be executed on the host processor 2.

Alternatively, as shown in FIG. 5, an entire function can be marked to be executed by one of the accelerator cores by adding a keyword to its definition.

The code of FIG. 5 defines a function called speedyFunction with a marker, _acceleratedfunction_, in its definition to indicate that speedyFunction function should be run on one of the accelerator cores 8, 9, 10. In a similar way a marker _unacceleratedfunction_ may be used to indicate that a particular function should not be run on one of the accelerator cores, but should instead be run on the host core 7.

In programming languages supporting function overloading, a function declaration of the type shown in FIG. 5 may be distinct from a function declaration without the _acceleratedfunction_ marker but which otherwise has the same signature. Calling the function from inside an acceleration section will cause the marked version of the function to be called, whereas a call from outside an acceleration section would result in a call to the function without the ¬_acceleratedfunction_ marker. While conventional function overloading arises when two function definitions have the same name but different function signatures (e.g. a different number and/or type of parameters, or differing pointer modifiers (includes implicit pointers)), it can be seen that here 'overloading' also arises from two definitions with the same function signature but different indications as to the processor core on which the function should be executed. Overload resolution can, for example, be performed according to the rules of the host programming language and if an ambiguity arises that cannot be resolved by those rules, a function could be selected based on the indication of the processor core.

It is further possible to specify that, within a specific acceleration section, particular named functions called within that acceleration section should themselves be executed on a specific accelerator core. An example is shown in FIG. 6. Here, the code indicates that functions a, b and c should be executed on the same accelerator core as the other code within the acceleration section. In order to allow the functions a, b and c to run on the accelerator core, the program partitioning tool creates duplicates of the functions a, b and c transformed to run on the accelerator processor as is described in further detail below.

In more detail, the code of FIG. 6 defines a function f which takes a function pointer as an argument. Code within the acceleration section defined within the function f calls the function provided as an argument to the function f. As above, an acceleration section is marked using the _accelerationsection_ marker to indicate that code inside the acceleration section executes on an accelerator core. Here, however, the _accelerationsection_ marker further specifies that, if any of the functions a, b, c are called by code within the acceleration section, these should be executed on the same accelerator core as code within the acceleration section. As such, if one of the functions a, b, c are indicated by the argument provided to the function f, the passed function will execute on the same accelerator core as other code within the acceleration section.

Acceleration sections can be nested such that an acceleration section can enclose another (child) acceleration section. Each acceleration section defines a context level within which data items are accessed and functions are called. Each context can be identified by an assigned identifier, such as a level index. For example an outer level context may be assigned the level index 0, where the outer context level is the main context level and code within the outer context level is processed by the host core 7. A first acceleration section will define a second context level and could be assigned the context level index 1. A further acceleration section within the first acceleration section will define a third context level and could be assigned the context level index 2 and so on. Each context level may contain source code for processing and execution by a different respective one of the accelerator cores 8, 9, 10.

The preceding description has explained how code can identify sections of code for execution on a particular one of the accelerator cores 8, 9, 10. Methods used to indicate how data accesses should be handled are now described.

Memory access semantics define the way in which memory accesses should be processed. In many systems, there is a single memory access semantic which specifies that when a data item is read from RAM, the data item is copied to local memory (e.g. registers or an on-chip cache) and that when a data item is written, it is written to the RAM. In parallel systems and multi-core processors however, it may be desirable to introduce further memory access semantics to specify different ways in which memory accesses should be processed.

When a computer program is run across a plurality of processor cores a distinction can be made between data which is private to code executing on a particular processor core and data that is shared between code executing on a plurality of processor cores. Therefore, in computer program code intended for execution on a multi-core processor it is useful to specify, in the source code, for each data access operation, whether the data being accessed is private or shared.

For example, a programming language may provide qualifiers to denote private and shared data. Variables can be annotated with private and shared qualifiers to indicate whether the variables are shared or private, while pointer types can also be qualified to specify whether they point to private or shared data. For example, a programmer may indicate that a variable should be stored in shared or private memory as follows:
a. _shared_ int sharedVariable;
b. _private¬¬_ int privateVariable;

Where the variable sharedVariable is shared between program code running on a plurality of processor cores, and the variable privateVariable is private to a particular processor core.

Similarly, a pointer can be marked as pointing to shared or private memory as follows:
a. _shared_ int *sharedDataPointer;
b. _private_ int *privateDataPointer;

Here, the integer pointer sharedDataPointer points to shared memory, while the integer pointer variable privateDataPointer points to memory which is private to a particular processor core.

Data items can be declared in different acceleration section context levels and can be accessed across context levels. Using the hypothetical notation from above, an example is shown in FIG. 7.

The example code of FIG. 7 defines a function f within which an integer data item, outerval, is declared and assigned a value of two. As outerval is declared at the host context level, level 0, (i.e. outside an acceleration section) the variable outerval is stored in the shared memory 11. Within an acceleration section within the function f, a second integer data item innerval is declared and assigned a value of four. As innerval is declared within a first acceleration section context level, the data item innerval will be stored in the local memory of the accelerator processor to which the acceleration section relates. For example, if the acceleration section relates to the accelerator core 8, the data item innerval will be stored at the local memory 12 of the accelerator core 8.

The data item outerval is accessed from code inside the acceleration section. Accessing a data item in a different context level from that in which it is defined causes a transfer of that data item from the context in which it is declared into the context in which it is needed. Such a transfer may be accomplished by way of a Direct Memory Access (DMA) request from the accelerator core 8, executing the code of the acceleration section, to the shared memory 11.

It will be appreciated that, additionally, pointer variables will also be within the context of a particular acceleration section.

For static pointer types the program partitioning tool 21 attaches information to the pointer type (for example when taking the address of a data item), that describes, in which context level the pointer target is located and the context level for which the pointer is generated (i.e. the context level in which the pointer variable is declared). The compiler 22 can then generate the appropriate data transfer instruction.

For dynamic pointer types context level information is not attached to the pointer type, but to the value of the pointer. The value of the pointer is then checked at runtime and, depending on what context information is attached, the appropriate data transfer is carried out. For example, memory addresses in the range 0-0x0FFF could be assigned to the shared memory 11, while addresses in the range 0x1000-0x1FFF could be assigned to the local memory of one of the accelerator cores, where each processor core is assigned a different address space. Alternatively, context level information (for example, in the form of a flag) could be attached to a pointer value (e.g. by representing the context level information as part of the pointer value, or by implementing pointers as structures consisting of pointer value and context level information).

Where acceleration sections are nested, data items may be accessed across several context levels. Where data is accessed across a plurality of context levels, the data item may be directly transferred to the context level in which it is needed from the memory associated with the context level in which it is declared, if such transfer supported by the hardware. Alternatively the requested data item may be transferred using a cascaded transfer, from one context level to the next, using temporary buffers.

Variables declared in different context levels may be accessed via different memory access semantics. For example, data might be accessed using a default memory access semantic outside any acceleration section, but software caching may be used when accessing data stored in the shared memory 11 from within an acceleration section. That is, a cache of some of the data stored at the shared memory 11 may be maintained from which data can be read, and to which data can be written, by code within an acceleration section.

Data private to a particular acceleration section can be accessed within that acceleration section using a default memory access semantic.

The use of software caching may be advantageous when accelerator cores can only access shared memory using direct memory access techniques or message passing. Software caching can allow a program to access data in the shared memory when running on an accelerator core in a way analogous to that in which it accesses data when running on the host core 7. Additionally, as described in our earlier patent application (International Patent Application Publication No. WO 2007/085855) writes to memory can be deferred until the end of an acceleration section, thereby allowing a compiler to maximise parallelism within the acceleration section.

Another memory access semantic which may be used is based upon a transactional memory implemented in software. Here, all reads to shared data are tracked, and all writes to shared memory are queued. Writes are applied to shared memory only if a correct ordering of reads and writes is maintained.

Another memory access semantic which may be used is based upon a garbage collection system. Here, all pointers within a particular context level (the particular context level being associated with a given memory space) may be specified as being traceable, such that with the memory space associated with that context level is subject to garbage-collection. A garbage-collection system can follow each of the traceable pointers to determine which data elements in the memory space are reachable by pointers to the memory space, and which data elements in the memory space are not reachable by pointers. All data elements that are not reachable can be freed and returned to the free memory pool.

Further modifiers may be specified to indicate that an acceleration section should be executed synchronously or asynchronously.

All code used inside an acceleration section is automatically (without need of further annotation) compiled by an appropriate compiler 22 for an accelerator core associated with the context level of that acceleration section. As such, entire call graphs having their root in an acceleration section are processed for the context level of that acceleration section to identify all functions called (directly or indirectly) from that acceleration section. Since different context levels can be mapped onto different accelerator processors with potentially different instructions sets, a function that is called from different context levers is compiled for each accelerator core associated with a context level in which it is used.

Pointer modifiers of the type described above allow a programmer to specify the target of particular pointers in pointer declarations. These modifiers may be necessary in some cases, for example when processing a function for an acceleration section leads to a conversion conflict between pointer types that have different acceleration section information. Such conversion conflicts are described in further detail below. To keep annotations to a minimum the program partitioning tool 21 is often able to deduce context level information for values and pointer types that have not been annotated. For example, the context level of a pointer may be deduced from the context level of a variable to which that pointer is initialised to point, and the context level of a function's return value may be deduced from a value included in the function's 'return' statement.

Allowing programmers to indicate that particular code should be executed on a particular processor core, and allowing data access semantics to be specified, is beneficial because although memory access semantics and choice of processor core can be deduced by particular circumstances prevailing in a computer program in some cases, in many cases it is preferable that a programmer can specify what is to happen. As such, the program partitioning tool 21 takes both functions that have been specified in the source code to be executed by specific processor cores, and with data access operations that have specific memory access semantics, and functions and data access operations that have no specified processor core or memory access semantics in the source code.

As is now described, the program partitioning tool 21 applies a series of rules to determine which functions should be compiled for which processor cores and which data access operations should have which data access semantics applied. Indeed, as indicated above, because a particular function may be called from several different contexts it may be necessary for the particular function to be compiled for execution on a plurality of processor cores, and with a plurality of memory access semantics.

For example, if, at one point in a program, a function f is called from a function having default data access semantics and which is to be run on the host core 7, and if, at another point in the program, the function f is called from an acceleration section with acceleration data access semantics, then the program partitioning tool 21 produces two transformed versions of the function f, a first that can be compiled for the host core 7 with default data access semantics and a second that can be compiled for an accelerator core, for example the accelerator core 8, with acceleration data access semantics. In order to maintain correct memory access semantics, a set of rules is applied to pointer and reference types. The processing performed by the program partitioning tool 21 to transform functions is described in further detail below.

In order to ensure data is correctly accessed, in some embodiments, the program partitioning tool 21 outputs a series of C macros, with different macros to read and write data using each different kind of data access semantic. The different C macros could be defined to carry out correct read and write operations for each given data access semantic.

For each function, the program partitioning tool 21 examines the call-site (that is, the context within the program code at which the function is called) and the higher-level intermediate representation of the called function (generated by the source code pre-processor 20) according to the criteria set out below.

If, in the higher-level intermediate representation, a function has a pointer type parameter with no specified memory access semantics, and if, when the function is called it is passed a pointer argument, then the corresponding parameter in the transformed function will have the same memory access semantics as the function argument that is passed at the call-site. For example, if a function which takes a pointer type parameter is passed a shared pointer, the transformed function will take a shared pointer parameter.

If, in the higher-level intermediate representation, a function has a reference type parameter with no memory access semantics specified, and is passed a reference type argument at the call-site, the corresponding parameter of the transformed function will have the same memory access semantics as the reference passed at the call-site. For example, if a function which takes a reference type parameter is called with a reference to memory private to a particular processor core, the transformed function will take a private reference parameter.

If a variable in the function to be transformed is declared to be of pointer type with no explicit memory access semantics specified, and if the variable is initialized to a pointer value, then the variable is created with the memory access semantics of the initialization value. No memory access semantics are attached to a variable during initialization if more than one memory semantic could apply to the initialization value. For example, where a pointer is initialized to a constant value, and that constant value is a valid address in different memory areas, no memory access semantics are attached to the variable unless its value is an address to specific memory, or the type of the constant (information attached to the pointer type) enforces specific memory semantics.

If a pointer with no explicit memory access semantics is declared in a function, and the variable is initialised to point to a private value, then the pointer variable is transformed to a private pointer. Similarly, if a pointer variable is declared within an acceleration section and is assigned to point to a shared variable, that the pointer will be transformed to an outer pointer.

If a pointer type variable having no memory access semantics specified, is accessed within, but declared outside of, a function to be transformed, and is not assigned or accessed before that function is called, and if, within the function to be transformed, that variable is assigned with a pointer value, then a duplicate of the variable is created having the memory access semantics of the assigned pointer value.

If a pointer type variable having no memory access semantics specified, is passed as an argument to a reference parameter of the function to be transformed, both the variable and the reference parameter type of the transformed function, will receive the memory access semantics from an initialization, if any, of the variable inside that transformed function.

If a variable in the function to be transformed is declared to be of reference type with no memory access semantics specified, and if the variable is initialized to reference a particular data item in memory, then the variable is created with the memory access semantics of the initialization data item (e.g. if the reference is a reference to private data, the reference is made private).

If the function includes a return statement, and the function returns a pointer or a reference with no memory access semantics specified, then the transformed function has a return type with memory access semantics being determined by the value being returned.

For any pointer types that remain with no memory access semantics specified at the end of function transformation, then a default memory access semantics should be chosen. This default semantics can be decided by the system implementer.

Then, the transformed function is type-checked to make sure that no conversions from pointers or references with one memory access semantics to pointers or references with another memory access semantics lead to undefined or unexpected behaviour. For example, conversions of pointers from one memory access semantic to another may be illegal, unless the destination memory access semantic is a superset of the source memory access semantic.

After transformations of the type described above, the transformed function is optimized (if required) and compiled to a target-compiler-readable intermediate representation to be provided to one of the compilers 22.

The transformations required (if any) will depend upon the nature of the particular function being processed as is now described with reference to various examples. In the following description, within an acceleration section, a qualifier ¬ '_outer' indicates that a variable is stored in the shared memory 11, while a qualifier '_inner' indicates that a variable is stored in the local memory of the accelerator core to which the acceleration section relates. It will be appreciated that the qualifiers used in the following description are merely exemplary and that any appropriate qualifiers could be used.

FIG. 8 shows a simple function, multiply, which takes as arguments a pair of values and returns a result. It can be seen that the function multiply does not have any dependencies on the global environment. As such the function multiply can be complied for each processor core on which it is to execute without any transformations being required.

A slightly more complex case is shown in the example of FIG. 9. Here, the function new_multiply takes a single parameter and multiplies the value which it is passed by the value of a global variable b. Here, the function new_multiply is transformed to create a duplicate of the function new_multiply in which reference to the global variable b is replaced with reference to the variable b stored in the shared memory 11, the shared memory 11 being accessed using DMA. Such transformation allows the function new_multiply to execute on each of the host core 7 and the accelerator cores 8, 9, 10, where the original function new_multiply executes on the host core 7 and the transformed duplicate executes on an accelerator core 8, 9, 10.

Functions called with pointer arguments (including both explicit pointer types or implicit pointer types, such as references in C++, VAR parameters in Pascal, implicit arguments such as the 'this' pointer and pointers to return values) inside an acceleration section are processed by the program partitioning tool 21 so that a compiler generates a copy of that function in which the pointer parameters in the copy contain the context information of the corresponding argument in the call. This process is described in further detail below.

An example of a function taking pointer variables rather than value variables, is shown in FIG. 10. A function another_multiply takes two pointer arguments, in place of two value arguments as was the case in the example of FIG. 8. In such a case function transformation may produce multiple transformations of the original function, depending on what combinations of arguments are used to invoke the function. Generally, with two pointer arguments, a and b, there are four possibilities: the variables a and b both point to locations in the shared memory 11, the variables a and b both point to locations in memory local to an accelerator core 8, 9, 10, the variable a points to shared memory 11 while the variable points b to memory local to an accelerator core 8, 9, 10, and vice versa. Thus, depending on usage, up to four versions of the function may be output. Combinations of parameters that can be determined not to occur (based upon the way in which the function is called) can be discarded or avoided i.e. duplication can be driven by demand, as determined by analysis of the arguments to each call of the function. The same approach can be applied for reference typed parameters. The duplications of the function cause the duplicated code to generate DMA transfers, in place of memory reads and writes, for accesses to arguments that are determined to reference shared memory 11, as opposed to memory local to a particular accelerator core 8, 9, 10.

An example of how a function taking reference parameters may be transformed is now described with reference to the pseudo code shown in FIG. 11.

Lines 1 to 4 of FIG. 11 define a function func. The function func takes two integer reference parameters and returns the result of multiplying the integer value referenced by the first parameter by the integer value referenced by the second parameter. As func takes integer references as parameters, it is the actual integer variables passed by reference on which the function func operates, and not copies of those integer variables (as is the case, for example, in the code of FIG. 8). That is, when func is called, it is necessary to access the locations in memory at which the passed variables are stored.

In a main function (from lines 5 to 16), an acceleration section is defined with an accelerationsection marker at line 9. The acceleration section marker splits the code of the main function into two context levels; code within the acceleration section, and code outside of the acceleration section. Code outside of the acceleration section is to be processed by the host core 7, while code inside the acceleration section is to be processed by, for example, the accelerator core 8.

Outside the acceleration section, at line 7, an integer variable, a, is defined and is assigned a value of two. As the integer a is defined outside the acceleration section, it is stored in the shared memory 11.

Within the acceleration section, at line 11, an integer variable, b, is defined and is assigned a value of three. As the integer b is defined within the acceleration section, it is stored in the local memory 12 of the accelerator core 8.

Within the acceleration section, the function func is called three times, and each time it is called it is passed a different combination of the variables a and b as parameters.

At line 12 func is called and is passed the variable a as a first parameter and the variable b as a second parameter. The comment (denoted by //) on line 12 illustrates how the function func is transformed in this case. It can be seen that the function is transformed such that the first parameter is preceded with a marker _outer. The marker _outer indicates that the first parameter is a reference to an integer defined outside of the acceleration section, i.e. is stored in shared memory 11. The second parameter is unchanged because the integer b defined within the same context as the call to the function func, i.e. the context of the acceleration section.

At line 13 func is called and passed the variable b as a first parameter and the variable a as a second parameter. The comment on line 13 shows how the function func is transformed in this case. It can be seen that the function is transformed such that the second parameter is preceded with a marker _outer. The first parameter is unchanged because the integer b was is within the same context as the call to the function func, i.e. the context of the acceleration section.

At line 14 func is called and passed the variable b as both its first and second arguments. The comment on line 14 shows that, in this case, both the first and second parameters are unchanged because the integer b is within the same context as the call to the function func.

At line 8, outside the acceleration section, the function func is called and passed the variable a as both its first and second arguments. In this case, because the function func is called outside of an acceleration section, no transformations to parameters are necessary.

From the preceding example, it can be seen that in a program with one acceleration section level (that is, no nested acceleration section levels), data items can be defined inside an acceleration section (level 1) or at host level (level 0). As indicated, for a function with two pointer type parameters up to four copies are required to handle the four different combinations of pointer type arguments with which the function may be called, that is (level 0, level 0), (level 0, level 1), (level 1, level 0), (level 1, level 1) where each tuple shows the acceleration section context levels of the arguments passed to the function.

Another example is shown in FIG. 12. The findMin function returns the smallest integer value in a list of integer values passed to findMin through its pointer parameter intList.

Within the acceleration section of the main function of FIG. 12, the function findMin is first called with an array, arrayOfIntegers, held in shared memory 11 which is declared as a global variable within the source code of FIG. 12. The program partitioning tool 21 will therefore create a transformed duplicate version of findMin which accepts an outer pointer (i.e. a pointer to the shared memory 11) as its argument. Without type inference, the compiler would reject the input program for attempting to assign an outer pointer (intList+1) targeting the shared memory 11 to an inner pointer p (declared within the findMin function), and as such the method duplication attempt would fail. With type inference, the initialisation of p to an outer pointer in the for loop is enabled by automatically associating the variable p with the _outer qualifier. As such, there is no need to perform extensive changes to the source code, given the automatic propagation of _outer qualifiers. The addition of explicit _outer qualifiers in the body of the method would require the programmer to create an overload of findMin, to handle the case of a local pointer parameter being given (as happens when the function findMin is called with the array localArrayOfIntegers) as its parameter. In contrast, inference of _outer qualifiers allows the program partitioning tool to generate appropriate overloads as needed.

A pointer declared outside an acceleration section always points to data in the host's shared memory 11. Such pointers are automatically given the _outer qualifier. Disallowing assignments between inner and outer pointers provides a useful degree of type checking across the host/accelerator boundary. For example, within an acceleration section, assigning an inner pointer to an outer pointer (or vice versa) results in a compile time error. This strong type checking prevents confusion which would otherwise arise when pointers to locations in one memory (e.g. the shared memory 11) are set to locations in another memory (e.g. one of the memories 12, 13, 14 of the accelerator cores 8, 9, 10). That said, it should be possible to allocate the contents of a particular memory location in one memory to a location in a different memory. This can best be seen in FIG. 13. Here, a global variable x of type float is declared at line 1. Within an acceleration section (lines 4 to 12) in a main function (lines 2 to 13), a pointer p to a value of type float is defined with an _outer qualifier at line 6, indicating that the pointer references a value in the shared memory 11. The pointer p is initialised to point to the memory location storing the variable x.

At line 7 a further variable a is defined. The variable a has no qualifier, and as such is an inner variable of the acceleration section. The variable a is assigned the value stored at the location indicated by the variable p, i.e. a location in the shared memory 11. In order to achieve this assignment, the value from the shared memory 11 is read by direct memory access.

At line 8, a value of 1.0 is stored at the location indicated by the pointer p. Given that the pointer p points to shared memory, the assignment involves writing data to the shared memory 11 using direct memory access.

Similar operations can be seen at lines 9 and 10. At line 9, a variable of type float is defined and initialised to the value x. Given that x is stored in the shared memory 11, this command makes use of direct memory access. Similarly, when the variable x is set to the value b, a direct memory access write command is used.

The instruction at line 11 seeks to cause the pointer p to point to the address of the variable a. It will be recalled that variable a (declared at line 7) is an inner variable, and as such the assignment attempted at line 11 is illegal. The instruction of line 11 will therefore be identified as an error by the program partitioning tool 21.

When applying method duplication to large examples, it is convenient to design the type system so that the _outer qualifier is automatically applied in some instances. Two contexts where _outer may be omitted by the programmer and automatically applied are in initializations and casts. That is, it is not necessary to use the _outer qualifier in declarations and in casts. This is particularly useful where existing source code is modified for use within the methods described herein because the quantity of manual source code annotation required by a programmer is reduced.

Considering first the case of initialisation, an example is presented with reference to a fragment of source code shown in FIG. 14. Here, a pointer variable x is declared outside an acceleration section. Within an acceleration section, a pointer variable z is declared. While, by default, the pointer z would be an inner pointer, here it can be seen that the _outer qualifier is explicitly used to indicate that the pointer variable z points to shared memory. As such, the pointer z can be validly assigned to the pointer x.

The pointer variable z2 is declared without the _outer qualifier. However, its declaration includes initialization to the pointer x. Given the pointer x is an outer pointer, it can be deduced, by the program partitioning tool 21, that the pointer z2 is also an outer pointer, and it can be created accordingly.

An example based upon casts is now described with reference to FIG. 15. Here a global pointer variable g of type T1 is declared. Within an acceleration section in the main function a pointer variable var of type T2 is declared which is explicitly indicated to be an outer pointer variable. The pointer variable var has assigned to it the value of the global pointer variable g, which is cast to be of type T2. Given that the cast is within an acceleration section, it would, by default, result in creation of an inner pointer. However, because the value which is being cast (i.e. g) is an outer pointer, the result of the cast operation is automatically deduced to be an outer pointer.

FIG. 16 shows a further example. Here, a pointer i to an integer value, passed as a parameter to the function reinterpretInt, is cast to be a pointer to a value of type float, and the value stored at the address indicated by the result of the cast operation is returned by the function. Here, the pointer created by the casting operation is determined to be an inner or outer pointer depending upon whether the pointer i is an inner or outer pointer.

The inner and outer qualifiers indicated above denote a binary classification of memory spaces, into those of level 0 and those of level 1. Syntax is provided to permit the expression of pointer types to an arbitrary number of levels. Pointer types can be declared using a construct such as _declspec (_setmemorylevel_(level)), where level is the acceleration section block level, which for example can have the value 1 for local pointers and 0 for outer pointers. Values for levels of 2 or higher indicate nested acceleration sections. It will therefore be appreciated that the qualifier _declspec(_setmemorylevel_(0)) is equivalent to _outer. The use of declspec allows accelerator local pointer types to be declared outside a acceleration section block which may be useful inside structure declarations to explicitly declare structure members with local pointer types.

It is often desirable to write software in object-oriented programming languages, such as C++, Java® or C#. For example, in the pseudo code of FIG. 17 an object type (called a class in many object-oriented languages) is defined with the name MyObject. A method called getIncrementedField is defined for MyObject that reads a data item, field, of MyObject, increments its value, and returns the incremented value.

When adapting software written in an object-oriented programming language to take into account data that is private to a particular processor core and data that is shared between processor cores, it is necessary to implement each method for objects that are private and shared. In the example shown in FIG. 17, this may require writing the getIncrementedField( ) method two or more times, with a specifier to indicate whether the object that the method operates on is private or shared. For example, the pseudo code of FIG. 17 may be modified by the program partitioning tool 21 to generate the pseudo code shown in FIG. 18. In this way, if an instance of MyObject is instantiated in an acceleration section, the method containing the _private specifier will be used, while if an instance of MyObject is instantiated outside of an acceleration section, the method containing the _shared specifier will be used.

Where embodiments of the invention are implemented to process computer programs written in a programming language such as C++ or C#, acceleration section versions of new, new[ ], delete and delete[ ] operators can be overloaded with _outer-qualified versions. This allows developers to separately manage heap data associated with memory local to an accelerator core from heap data associated with the shared memory.

Overload resolution can ensure that a version of the delete operator associated with the shared memory is called on pointers qualified with _outer. Where the outer version of new is called, the _outer modifier is automatically added after the new keyword so as to create the relevant object in the shared memory.

In some cases, it is not necessary for a call to the new operator to explicitly call the outer version of the new operator as the correct version of the new operator can be deduced based upon parameters provided to the operator, and more particularly whether those parameters are inner or outer parameters.

In some cases overloading rules may apply which mean that a default acceleration section new operator cannot be overloaded with a default acceleration section outer new operation as both function signatures differ only in the return type.

The issues described above with regard to object oriented classes also apply to type definitions, for example structs. By default, pointers defined within type definitions, for example typedef statements in C-like languages, are outer pointers to the shared memory 11. This ensures that such type definitions can be used by code running both on the host core 7 and the accelerator cores 8, 9, 10. That said, it is advantageous to allow the definition of types having inner pointers, so that such types can be more efficiently used when running on one of the accelerator cores 8, 9, 10. To enable the use of inner pointers, type definitions can be duplicated, so as to provide a version using outer pointers and a version using inner pointers. It will be appreciated that such duplication of type definitions can result in function duplication so as to provide versions of a particular function, which can operate both with the type definition using an outer pointer and the type definition using an inner pointer.

For function pointers or virtual methods, a user of the system may need to specify that specific functions should be included within the set of functions to be duplicated. Alternatively, the program partitioning tool 21 may determine this set of functions by using whole program analysis. The build tool 23 calls the correct compilers 22 and linkers for each processor core in the system, and links in the correct runtime system for the correct memory access semantics for each acceleration section or data object.

It is possible to delay the specification of the set of functions to be duplicated until link time using placeholder symbols as references to function sets containing transformed functions. The set of functions that a placeholder symbol represents is defined at another location, and could be within another compilation unit (i.e. a separately compiled block of code). At link time, the final set of functions to be duplicated is built by resolving the placeholder symbol in the specification with the definitions from other compilation units. If a placeholder symbol is defined multiple times, the final set of functions may be the union set of those definitions. If a placeholder symbol is specified in the function set but not defined in any compilation unit, the build tool generates an appropriate error.

The build tool 23 can make sure that functions are only recompiled if they have been modified since the last compilation, thereby decreasing the time required to re-compile programs after modification.

Once a function has been transformed, then it is available to be called from other equivalent call-sites (for example, a call to the same function within the same context level). As such an already-transformed function is used if possible, to avoid unnecessary re-transformation of the function. The function transformation tool needs to store these already-transformed functions in an internal store.

It will be appreciated the computer programs to which the methods described above are applied may originate as a plurality of source code files (referred to as compilation units), and each of these files may be processed separately. As such, a function called inside an acceleration section in a first source code file may be defined in a different second source code file. If the function is not called from within an acceleration section in the second source code file, the program partitioning tool will not be able to determine, when processing the second source code file, that the function should be compiled for a particular accelerator core. This can result in a link error when a call to the function from within the accelerator section is attempted. To avoid this a function attribute _duplicate is used to trigger the duplication of the function explicitly if required. That is, the function could be qualified with the _duplicate attribute to ensure that a version of the function is compiled for the appropriate accelerator core.

The _duplicate attribute has optional arguments which specify function signatures which the compiler will generate duplicates for. Without parameters to _duplicate, pointer and reference types that may be contained in the signature of the original function will be local pointer/reference types in the acceleration section duplicate function, and as has been explained above, it is sometimes beneficial to provide versions of a particular function which can operate using combination of inner and outer variables.

Figure 19:
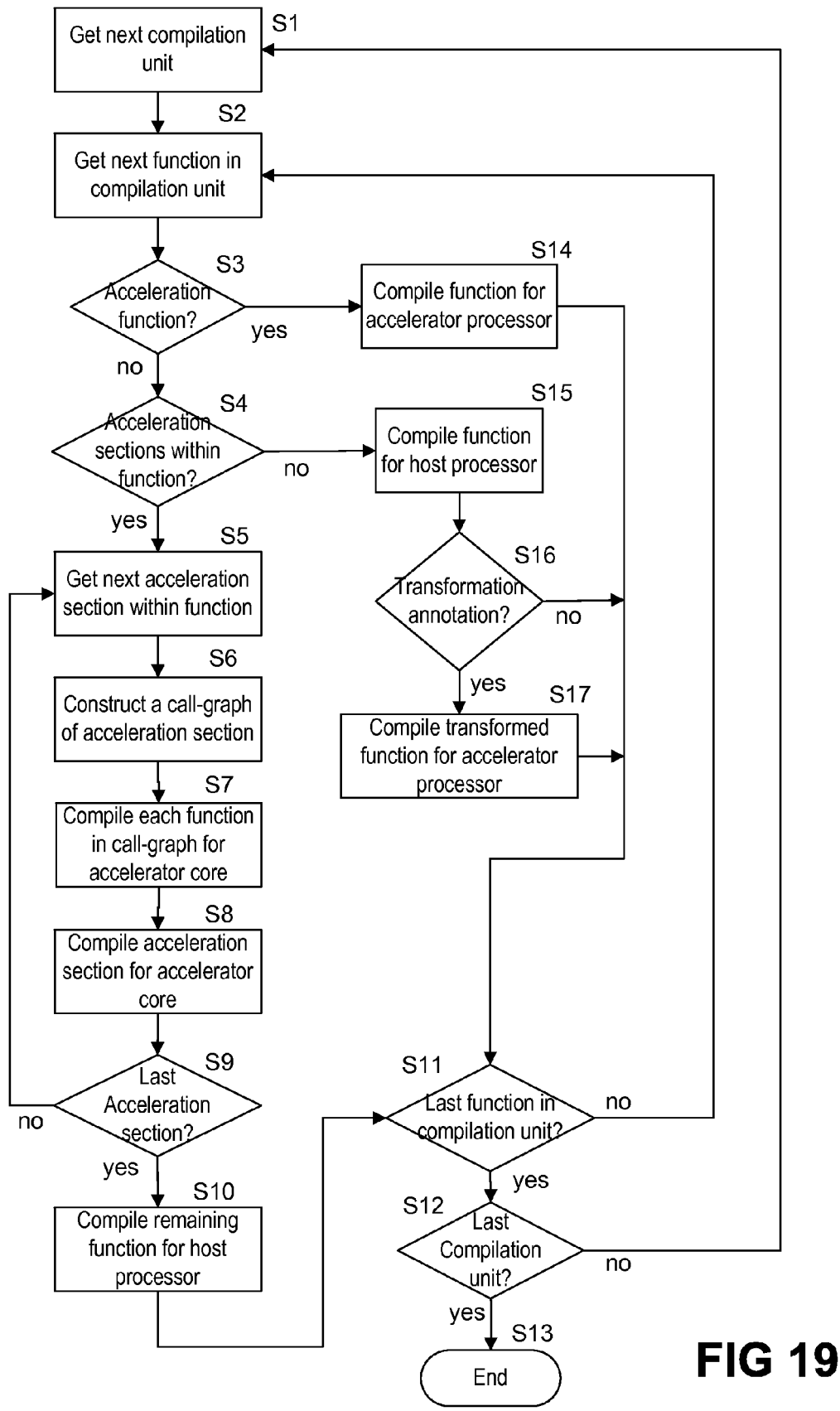
FIGS. 19 and 20 are flowcharts showing processing of program code to generate duplicates of functions within that program code in accordance with embodiments of the present invention.

FIG. 19 is a flowchart showing, at a high level, an algorithm for compilation of programs using explicit function duplication of functions. In the following description, the term "compilation unit" is used to indicate individually processed source code.

At step S1 a compilation unit in a set of compilation units to be compiled is selected. At step S2, a function within the selected compilation unit is selected. At step S3 it is determined whether the selected function is an acceleration function, such as, for example, the function speedyFunction shown in FIG. 5. If it is determined that the selected function is not an acceleration function, processing passes to step S4, at which it is determined whether the selected function contains any acceleration sections. If, at step S4 it is determined that the selected function does contain one or more acceleration sections, processing passes to step S5, at which an acceleration section within the selected function is selected.

Processing passes from step S5 to step S6 at which a call-graph is constructed for the functions called by code within the selected acceleration section. Processing then passes to step S7 at which each of the functions indicated in the call-graph is compiled for execution on an accelerator core 8, 9, 10 with which the acceleration section is associated. From step S7, processing passes to step S8, at which the body of the acceleration section is compiled for execution on the appropriate accelerator core 8, 9, 10.

Processing then passes to step S9 at which it is determined whether the selected acceleration section is the last acceleration section within the selected function. If it is determined that the selected acceleration section is not the last acceleration section within the selected function, processing passes back to step S5 and the next acceleration section within the selected function is selected.

If, on the other hand, it is determined at step S9 that the selected acceleration section is the last acceleration section in the selected function, processing passes to step S10 at which the remaining code in the selected function (i.e. the code not within an acceleration section) is compiled for execution on the host processor 7.

From step S10 processing passes to step S11 at which it is determined whether the selected function is the last function in the currently selected compilation unit. If it is determined that the selected function is not the last function in the currently selected compilation unit, processing passes back to step S2 and the next function in the currently selected compilation unit is selected.

If, on the other hand, it is determined at step S11 that the selected function is the last function in the currently selected compilation unit, processing passes to step S12, at which it is determined if the currently selected compilation unit is the last compilation unit to be compiled. If it is determined that the currently selected compilation unit is not the last compilation unit to be compiled, processing passes back to step S1 and the next compilation unit to be compiled is selected. If, on the other hand, it is determined at step S12 that the currently selected compilation unit is the last compilation unit to be compiled, processing finishes at step S13.

If, at step S3 it is determined that the selected function is an acceleration function, processing passes to step S14 at which the selected function is compiled for execution on an appropriate one of the accelerator cores 8, 9, 10. Processing passes from step S14 to step S11.

If, at step S4 it is determined that the selected function does not contain any acceleration functions, processing passes to step S15 at which the selected function is complied for execution on the host processor 7. Processing passes from step S15 to step S16 at which it is determined whether the selected function is explicitly annotated for function duplication, for example, using the ¬ ¬ _duplicate modifier described above. If it is determined that the selected function is not annotated for duplication, processing passes from step S16 to step S11. If, on the other hand, it is determined at step S16 that the function is annotated for duplication, processing passes to step S17 and the selected function is compiled for execution on the accelerator processor. Processing passes from step S17 to step S11.

It will be appreciated that the method described above with reference to FIG. 19 makes use of the _duplicate modifier only if it is determined that a function has no acceleration sections and is not itself an acceleration function. It will be appreciated that modifications can be made to the described method to make use of the _duplicate modifier when a function is an acceleration function but it is desired to duplicate the function by compiling the function for execution on an alternative accelerator core.

The processing described with reference to FIG. 19 above handles independence of compilation units in the compilation process and ensures that sections of code which should be executed on an accelerator processor are correctly transformed for execution on an accelerator processor. Given independent compilation of compilation units, duplication does not cross the boundaries of translation units except at the explicit instruction of the programmer via annotations using the _duplicate modifier.

Figure 20:
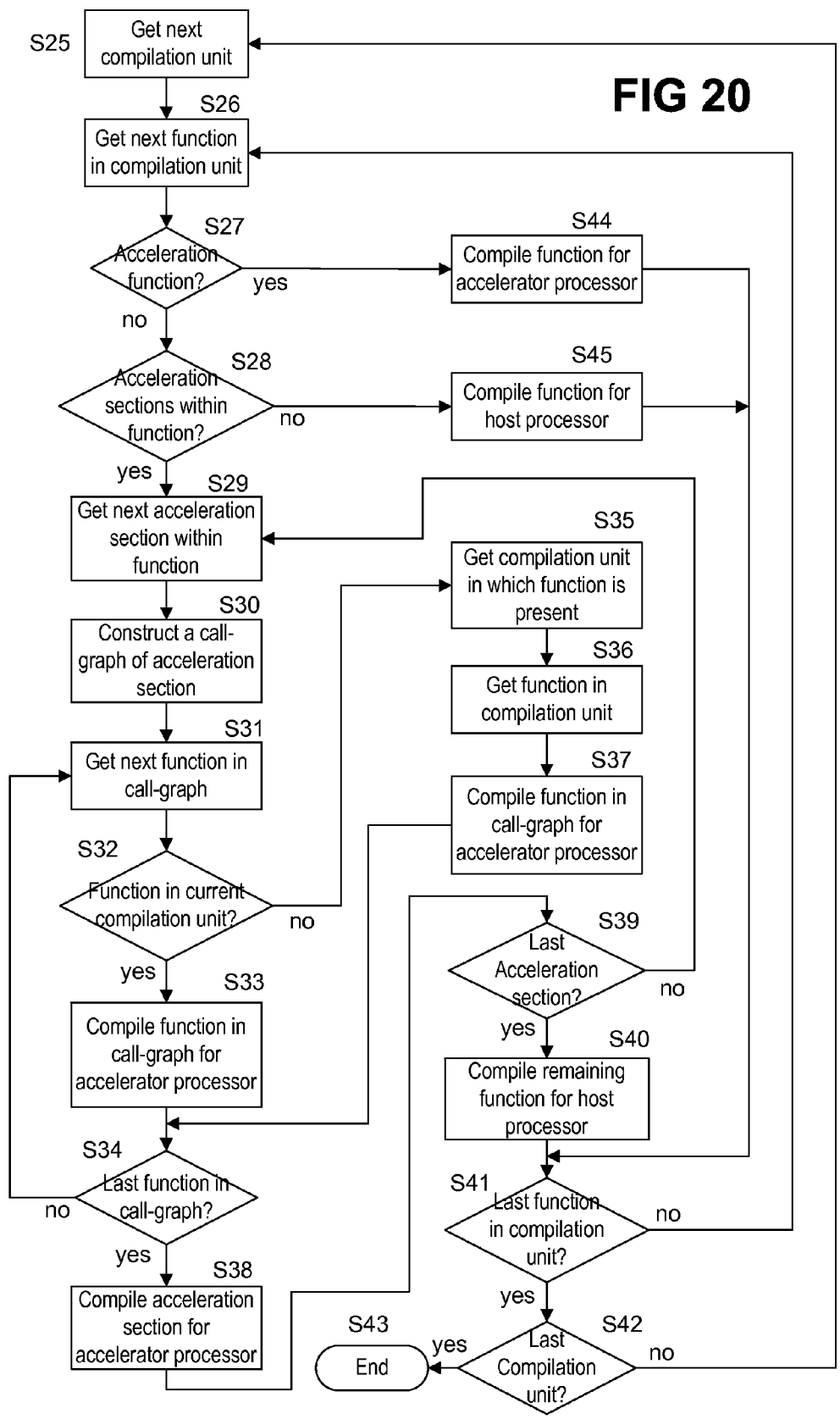

An approach to duplication that avoids the need to annotate functions for duplication is achieved if the compiler is able to, in the compilation of a particular compilation unit, identify any unresolved duplicate functions i.e. functions needing duplication whose bodies are not in the current compilation unit, and to recompile the dependencies to produce the required duplicates of the non local functions. FIG. 20 is a flowchart showing processing carried out to identify and recompile functions in different compilation units.

At step S25, a compilation unit in a set of compilation units to be compiled is selected. At step S26, a function within the selected compilation unit is selected. At step S27 it is determined whether the selected function is an acceleration function. If it is determined that the selected function is not an acceleration function, processing passes to step S28, at which it is determined whether the selected function contains any acceleration sections. If, at step S28 it is determined that the selected function does contain one or more acceleration sections, processing passes to step S29, at which the first acceleration section within the selected function is selected.

Processing passes from step S29 to step S30 at which a call-graph is constructed for the functions called by code within the selected acceleration section. Processing then passes to step S31 at which a function in the call-graph created at step S31 is selected. Processing then passes to step S32 at which it is determined whether the function selected at step S31 is part of the current compilation unit. If it is determined that the function selected at step S31 graph is part of the current compilation unit, processing passes to step S33, at which the function selected at step S31 compiled for an appropriate one of the accelerator cores 8, 9, 10. Processing passes from step S33 to step S34 at which it is determined if the selected function is the last function in the call-graph. If it is determined that the selected function is not the last function in the call-graph, processing passes back to step S31 and the next function in the call-graph is selected.

If, at step S32 it is determined that the function selected from the call-graph is not in the current compilation unit, processing passes to step S35 at which the compilation unit containing the function selected at step S31 is determined and selected. Processing passes from step S35 to step S36 at which the function selected at step S31 is selected from within the compilation unit selected at step S35. Processing then passes to step S37 and the function selected at step S31 is compiled for execution on an acceleration processor 8, 9, 10. Processing passes from step S37 to step S34.

If, at step S34, it is determined that the function selected at step S31 is the last function in the call-graph, processing passes to step S38 at which the body of the selected acceleration section is compiled for execution on an appropriate one of the accelerator cores 8, 9, 10.

Processing passes from step S38 to step S39, at which it is determined if the currently selected acceleration section (selected at step S29) is the last acceleration section within the currently selected function (selected at step S26). If it is determined that the currently selected acceleration section is not the last acceleration section within the currently selected function, processing passes back to step S29 and the next acceleration section is selected. If, on the other hand, it is determined at step S39 that the current acceleration section is the last acceleration section in the selected function, processing passes to step S40 at which the remaining code of the selected function (i.e. the code not within an acceleration section) is compiled for execution on the host processor 7.

From step S40 processing passes to step S41 at which it is determined whether the selected function is the last function in the currently selected compilation unit. If it is determined that the selected function is not the last function in the currently selected compilation unit, processing passes to step S26 and the next function in the currently selected compilation unit is selected.

If, on the other hand, it is determined at step S41 that the selected function is the last function in the currently selected compilation unit, processing passes to step S42, at which it is determined if the currently selected compilation unit is the last compilation unit to be compiled. If it is determined that the currently selected compilation unit is not the last compilation unit to be compiled, processing passes to step S25 and the next compilation unit to be compiled is selected. If, on the other hand, it is determined at step S42 that the currently selected compilation unit is the last compilation unit to be compiled, processing finishes at step S43.

If, at step S27 it is determined that the selected function is an acceleration function, processing passes to step S44 at which the selected function is compiled for execution on an accelerator processor 8, 9, 10. Processing passes from step S44 to step S41.

If, at step S28 it is determined that the selected function does not contain any acceleration functions, processing passes to step S45 at which the selected function is complied for execution on the host processor 7. Processing passes from step S45 to step S41.

By saving to disk all of the functions in the entire program source that have been processed, but not been transformed, functions can be transformed as required, across the entire program, and not just a single compilation unit. By maintaining a store of previously transformed functions and their original source, it is possible to only transform those functions that were not transformed on the previous compile, or have changed since the previous compile.

If a function is called from an acceleration section, but the source code of the called function is not available, then the function needs to be performed in the context for which the called function has been compiled. For example, if the function was compiled for level 0 (host level) and called from acceleration section level 1, a call to the called function may be dispatched via the host core 7. This mechanism can also be used to spawn more acceleration sections thus enabling even better utilisation of accelerator cores leading to more parallelism and even lower power consumption. That is, if a called function is only compiled for a particular accelerator core, that function may be caused to run on that accelerator core from code running on another of the accelerator cores. This can be achieved using a remote call where the arguments for the call are sent via a message-passing system to the relevant processor core.

In a processor, such as the Cell BE processor, where a host processor core has normal memory access semantics and accelerator processor cores have local memory and DMA access to shared memory, then code outside any acceleration section should be passed through the system and behave as expected. Code inside an acceleration section should be converted into a function that is transformed to run on an accelerator core. To start execution of code on the accelerator core, the function that contains an acceleration section should call a runtime function to load the entire call-graph of transformed functions onto the accelerator core and issue a function call on the accelerator processor to call the transformed function that represents the body of the acceleration section. To achieve this, the build tool 23 provides code which is arranged to copy the call graph of transformed functions onto an accelerator core as required.

Within an acceleration section, accelerator specific features such as DMA may be used. Such features may be untyped and therefore relatively unsafe (in a programming sense), but can offer high performance to the programmer. The source code pre-processor is able to analyse code inside an acceleration section, and provide advice to a programmer suggesting manual or automated changes to the program code which will allow features such as DMA to be more effectively used.

In the case of automated changes, access patterns to data in host memory that are inefficient when performed using particular data access semantics (e.g. software caching) are detected. One such access pattern may involve reading a sequence of items from an array in host memory, using outer pointer arithmetic and access to memory locations indicated by the pointer arithmetic. In such a case a sequence of instructions can be generated and provided to a tool arranged to modify the input source code so as to replace pointer arithmetic and dereferencing accesses with type safe, efficient DMA access.

A C++ template class is used to provide a type safe interface through which DMA features may be used. Operator overloads allow the substitution of an instance of this class, parameterized with the appropriate type parameter, for an _outer pointer in the code. Dependent on the access pattern, different C++ templates may be instantiated. Such templates may perform reads or writes on demand, or cache an outer array from host memory in accelerator memory.

Another example of automated code modification which may be used to improve efficiency involves adding local variables to the parameter list of a acceleration section block.

It will be appreciated that automated source code modifications of the type described above can be implemented in any convenient way. For example, a computer program may take as input the original source code and a sequence of instructions generated by the source code pre-processor. Such a computer program then outputs the modified source code. A computer program arranged to carry out such modifications can be conveniently provided by way of a plug-in to an existing source code development environment.

Figures 21, 22:
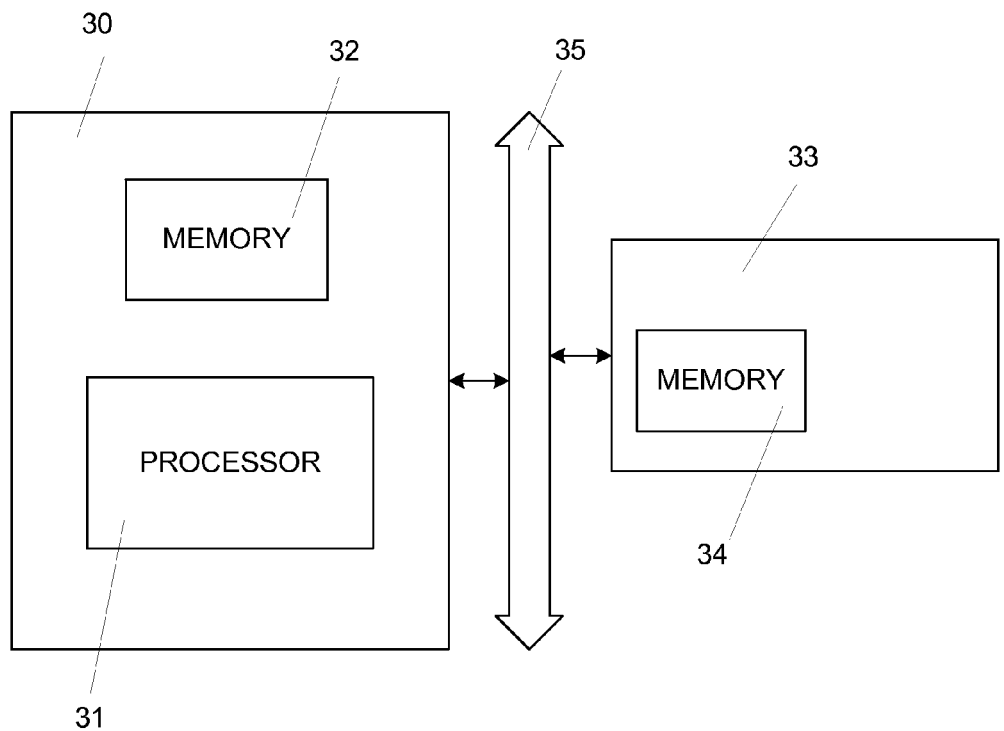
FIG. 21 is a schematic illustration showing components of a computer comprising a host processing unit having a shared memory and an accelerator processing core connected to the host processing unit by a bus.
FIG. 22 is an example of program code which can be processed to run on the components shown in FIG. 21.

FIG. 21 shows a processor arrangement on which code processed by an embodiment of the invention can be executed. A host processing unit 30 comprises a host processor core 31 and a host memory 32. An accelerator processor 33 having local memory 34 is connected to the host processing unit 30 by an external bus 35. The accelerator processor 33 is able to access data stored in the host memory 32 using DMA commands. In order to do this the host processor core 31 first prepares data in a data buffer in the host memory 32, the contents of the data buffer being accessible by the accelerator processor 33.

In order to conveniently allow such an arrangement, two nested acceleration sections may be used, as shown in the code of FIG. 22. Here, code 40 is outside any acceleration section, and is executed on the host processor core 31. Code within a first level acceleration section 41 is arranged to copy data into data buffers which are accessible to the accelerator processor 33. Code within a second level acceleration section 42 is executed on the accelerator processor 33 and makes use of inner variables which access data in the local memory 34.

Figure 23:
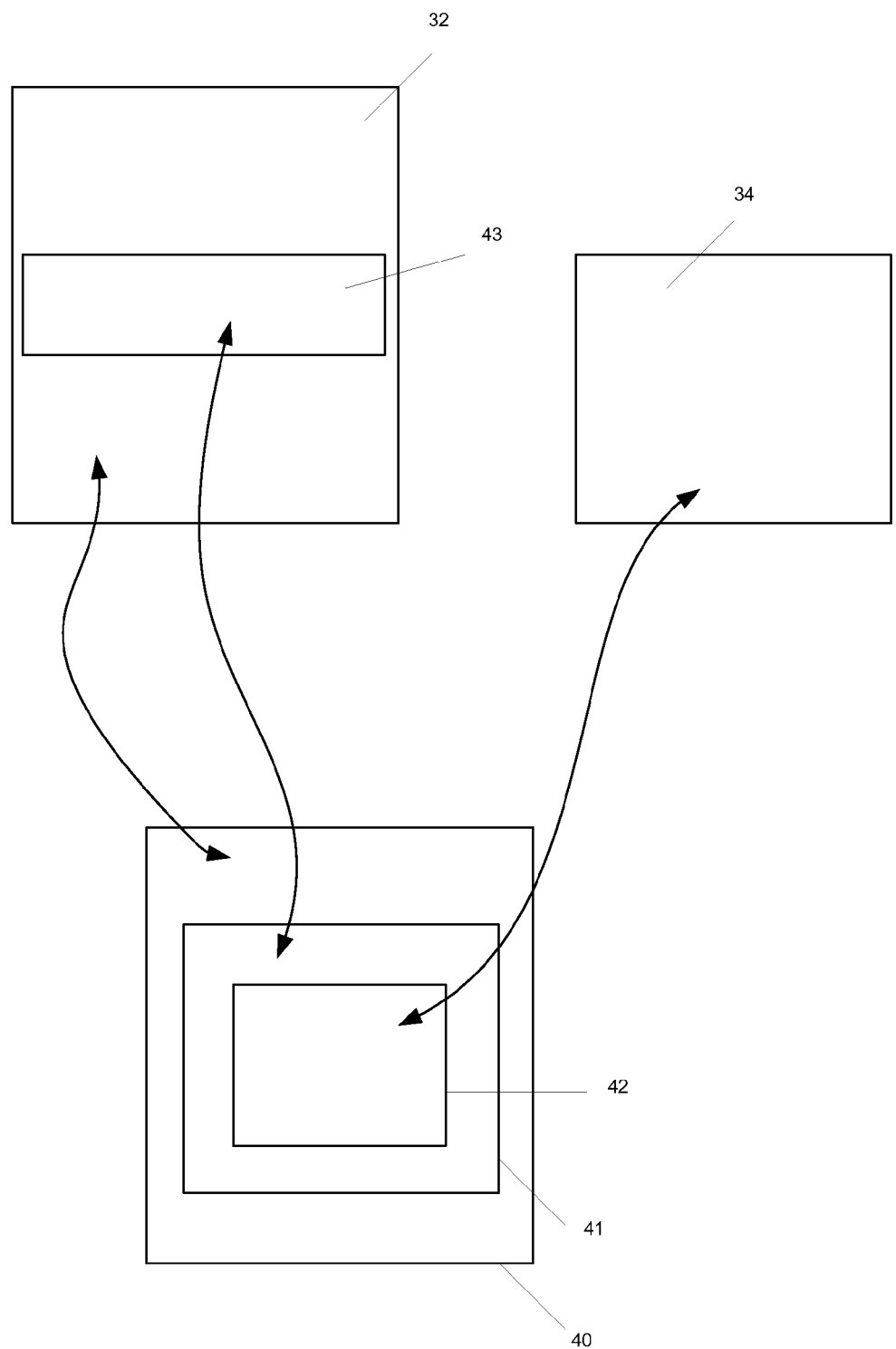
FIG. 23 is a schematic illustration showing the relationships between the program code of FIG. 22 and the components of FIG. 21.

Referring now to FIG. 23, it can be seen that the code 40 accesses the host memory 32. Code within the first level acceleration section 41 accesses an area 43 of the host memory 32 which provides data buffers which are accessible to the accelerator processor 33 using DMA. Code within the second level acceleration section makes use of the local memory 34.

Referring to the code of FIG. 22 in further detail, at line 4 a variable is declared which is stored in the host memory 32. At line 7, within the first level acceleration section 41, a variable is declared which is initialised to the value of the variable declared at line 4. Given that the declaration of line 7 is within the first level acceleration section, the variable declared is stored in the area 43 of the host memory 32.

Within the second level acceleration section 42, a further variable is declared at line 8. Here, the variable is created in the local memory 34 because it is within the second level acceleration section. The created variable is initialised using the variable created at line 7 (i.e. with data from the area 43 of the host memory 32).

At line 11, the variable created at line 7 is set to be equal to the value of the variable initialised at line 10. In this way, data is written to the area 43 of the host memory 32—i.e. data is written back to the host memory using DMA.

In some embodiments the compilers 22 are conventional compilers. As such the methods described herein provide code which can be compiled using such conventional compilers. With this in mind, the arrangement of data in memory may be important, including the size, orders, alignments, padding and byte order of program data.

Source code processed using embodiments of the invention may make use of standard library functions. Given that source code may be executed on any one of the processor cores, it is preferred that such library functions are made available for execution on each processor core.

Embodiments of the invention therefore have the ability to generate assertions on properties of data layout for program types during compilation. These assertions can take the form of C++ program text, expressing static assertions on the size and alignment of aggregate types, and the offsets of components. Incorporating these assertions into program text, and compilation via a conventional compiler ensures interoperability.

The preceding description has explained how acceleration sections can be specified within source code so as to cause particular code within an acceleration section to execute on a particular processor core. In order to allow acceleration sections to be properly handled, the source code should satisfy some basic restrictions. For example, the source code cannot include local jumps (e.g. goto) and long jump commands which cross acceleration section boundaries. Such restrictions may be enforced by the source code pre-processing tool 20.

While the preceding description has described a separation of tasks between various components of a system, it will be appreciated that the tasks described above may be separated between the various components of the system in any convenient way. For example, while it is described that the source code pre-processor 20 performs syntactic and type checking, such checking may instead be performed by the program partitioning tool 21.

The preceding description has explained how particular constructs can be applied to source code to cause execution of that source code on multiple processor cores. A pre-processor may be provided which takes as input modified source code and removes the described constructs so as to allow the source code to be conventionally processed for execution. In this way, source code portability is maintained.

Although various features of the invention have been described with reference to C++ like pseudo code, it will be appreciated that the methods described herein can be applied to any suitable programming language. As such, while in the preceding description reference has been made to functions, it will be appreciated that the term function is intended to encompass the similar constructs of methods (in an object oriented sense), procedures and sub-routines.

It will also be appreciated that although particular modifiers and key words have been used in the examples given herein, embodiments of the invention can be implemented using any suitable modifiers and key words.

Where references have been made in the preceding description to processor cores, it will be appreciated that the described methods are suitable for use where code is executed across a plurality of discrete processors, and different parts of the code are executed by different ones of the processors.

The invention claimed is:

1. A method executed by a processor for processing computer program code to enable different parts of the computer program code to be executed by different processing elements of a plurality of communicating processing elements, the method comprising:
   identifying at least one first part of the computer program code which is to be executed by a particular one of said plurality of communicating processing elements;
   identifying at least one further part of the computer program code which is related to said at least one first part of the computer program code, wherein said at least one further part of said computer program code is referenced in said computer program code at least twice, each reference comprising a respective memory access operation;
   creating a first modification of said at least one further part of said computer program code based upon a first respective memory access operation and creating a second modification of said at least one further part of said computer program code based upon a second respective memory access operation; and
   causing said at least one first part of the computer program code and said at least one further part of the computer program code to be executed by the particular one of said plurality of communicating processing elements.

2. A method according to claim 1, wherein:
   each of said plurality of communicating processing elements has a respective type;
   identifying at least one first part of the computer program code which is to be executed by a particular one of said plurality of communicating processing elements comprises identifying a particular type of processing element on which said at least one first part of the computer program code is to be executed; and
   causing said at least one first part of the computer program code and said at least one further part of the computer program code to be executed by the particular one of said plurality of communicating processing elements comprises causing said at least one first part of the computer program code and said at least one further part of the computer program code to be executed by one of said plurality of communicating processing elements having said particular type.

3. A method according to claim 2, wherein a plurality of said communicating processing elements have said particular type; and
   wherein causing said at least one first part of the computer program code and said at least one further part of the computer program code to be executed by one of said plurality of communicating processing elements having said particular type further comprises selecting one of said plurality of communicating processing elements having said particular type.

4. A method according to claim 1, wherein identifying at least one first part of the computer program code comprises identifying at least one program construct indicating that the at least one first part of the computer program code is to be executed by said particular one of said plurality of communicating processing elements.

5. A method according claim 1, wherein said at least one further part of the computer program code is referenced in said at least one first part of the computer program code.

6. A method according to claim 5, wherein said at least one further part of the computer program code is a function, and said function is called from said at least one first part of the computer program code.

7. A method according to claim 6, wherein said function is called indirectly from said at least one first part of the computer program code.

8. A method according to claim 7, wherein said reference to said at least one further part of the computer program code is a call to a virtual function and said at least one further part of the computer program code is an implementation of said virtual function.

9. A method according to claim 7, wherein said at least one first part of the computer program code is arranged to receive a reference to said function and to call said function in response to receipt of said reference.

10. A method according to claim 1 wherein said causing comprises compiling said at least one first part of the computer program code and said at least one further part of the computer program code for the particular one of said plurality of communicating processing elements.

11. A method according to claim 1, further comprising:
    identifying at least one second part of the computer program code which is to be executed by a plurality of said plurality of communicating processing elements; and
    causing said second part of the computer program code to be executed by said plurality of said plurality of communicating processing elements.

12. A method according to claim 11, wherein said computer program code comprises first and second references to said second part of the computer program code, and causing said second part of the computer program code to be executed by said plurality of said plurality of communicating processing elements comprises causing said second part of said computer program code to be executed on a first processing element in response to said first reference and on a second processing element in response to said second reference.

13. A method according to claim 12, wherein said first processing element is determined based upon a processing element executing the first reference and the second processing element is determined based upon a processing element executing the second reference.

14. A method according to claim 1, wherein:
    said plurality of communicating processing elements access data stored in a plurality of storage areas; and
    said causing comprises modifying said at least one first part of said computer program code and said at least one further part of said computer program code to access data in the plurality of storage areas.

15. A method according to claim 14, wherein the computer program code comprises a plurality of context levels and said modifying comprises modifying at least one memory access operation based upon said plurality of context levels.

16. A method according to claim 15, wherein said modifying at least one memory access operation is based upon the relative context levels at which a data item associated with the memory access operation is declared and at which the memory access operation is effected.

17. A method according to claim 16, wherein each context level has an associated storage area, and said modifying comprises modifying a memory access operation in a first context level which accesses data in a storage area associated with a second context level, the second context level being distinct from said first context level.

18. A method according to claim 17, wherein said modifying comprises modifying said memory access operation in said first context level to access a software implemented cache associated with said second context level.

19. A method according to claim 17, wherein said modifying comprises modifying said memory access operation such that said memory access operation is performed using a software transactional memory technique.

20. A method according to claim 17, wherein said modifying comprises modifying said memory access operation such that said memory access operation is performed using a data transfer over a computer network.

21. A method according to claim 16, wherein for a storage space associated with a particular context level, data stored within that storage space is subject to automatic memory management.

22. A method according to claim 21, wherein said automatic memory management comprises garbage collection.

23. A method according to claim 17, wherein said modifying comprises adding an identifier of the storage area associated with the second different context level to the memory access operation.

24. A method according to claim 1, wherein said plurality of communicating processing elements access data stored in a plurality of storage areas, the first memory access operation accesses data in a first storage area and the second memory access operation accesses data in a second different storage area.

25. A method according to claim 1, further comprising:
processing the first reference to said at least one further part of said computer program code to add reference to the first modification of said at least one further part of said computer program code;
processing the second reference to said at least one further part of said computer program code to add reference to the second modification of said at least one further part of said computer program code.

26. A method according to claim 1, further comprising:
creating a copy of said at least one first and said at least one further parts of said computer program code;
wherein said causing comprises modifying said copy of said at least one first part of said computer program code and said copy of said at least one further part of said computer program code to access data in the plurality of storage areas.

27. A method according to claim 1, wherein said plurality of communicating processing elements are processors.

28. A method according to claim 1, wherein said plurality of communicating processing elements are processor cores of a multi-core processor.

29. A non-transitory computer readable medium carrying a computer program comprising computer readable instructions arranged to cause a computer to carry out a method according to claim 1.

* * * * *